United States Patent
Zhang et al.

(10) Patent No.: US 10,637,269 B2
(45) Date of Patent: Apr. 28, 2020

(54) SERVICE BATTERY CHARGING MANAGEMENT DEVICE AND METHOD FOR POWER SUPPLY OF RECREATIONAL VEHICLE

(71) Applicant: TBB POWER (XIAMEN) CO., LTD., Xiamen, Fujian (CN)

(72) Inventors: Lingtao Zhang, Fujian (CN); Huafeng Zeng, Fujian (CN)

(73) Assignee: TBB POWER (XIAMEN) CO., LTD., Xiamen, Fujian (CN)

(*) Notice: Subject to any disclaimer, the term of this patent is extended or adjusted under 35 U.S.C. 154(b) by 0 days.

(21) Appl. No.: 16/186,912

(22) Filed: Nov. 12, 2018

(65) Prior Publication Data

US 2019/0319461 A1 Oct. 17, 2019

(30) Foreign Application Priority Data

Apr. 17, 2018 (CN) .......................... 2018 1 0342840

(51) Int. Cl.
| | |
|---|---|
| H02S 40/38 | (2014.01) |
| H02J 7/00 | (2006.01) |
| B60R 16/033 | (2006.01) |
| H02J 7/14 | (2006.01) |
| H02J 7/35 | (2006.01) |
| B60L 1/00 | (2006.01) |
| B60L 1/14 | (2006.01) |
| B60P 3/32 | (2006.01) |

(52) U.S. Cl.
CPC ............ *H02J 7/007* (2013.01); *B60R 16/033* (2013.01); *H02J 7/14* (2013.01); *H02J 7/35* (2013.01); *H02S 40/38* (2014.12); *B60L 1/003* (2013.01); *B60L 1/14* (2013.01); *B60P 3/32* (2013.01); *B60Y 2300/91* (2013.01); *B60Y 2400/204* (2013.01); *B60Y 2400/216* (2013.01)

(58) Field of Classification Search
CPC ...................................................... H02S 40/38
USPC .......................................................... 320/101
See application file for complete search history.

(56) References Cited

U.S. PATENT DOCUMENTS

2012/0153726 A1* 6/2012 Moon ....................... H02J 3/32
307/46
2018/0029486 A1* 2/2018 Pfeilschifter ........... B60L 53/30

* cited by examiner

*Primary Examiner* — Edward Tso
*Assistant Examiner* — Ahmed H Omar
(74) *Attorney, Agent, or Firm* — Rankin, Hill & Clark LLP

(57) ABSTRACT

The present application relates to a service battery charging management device and method for power supply of a recreational vehicle, wherein, the service battery charging management device for power supply of recreational vehicle includes: a vehicle generator, a solar cell panel, a MCU main control unit, an input automatic switching unit, a charging main converting DC/DC circuit, a service battery, a PWM mode charging unit, and a load. The MCU main control unit controls the input automatic switching unit according to an output voltage of the solar cell panel and an output voltage of the vehicle generator, which enables the solar cell panel and the vehicle generator to selectively serve as a charging power supply of the service battery to enable the service battery to be kept in an alternative-charging state, so that normal power supply of household electricity consumption of the recreational vehicle can be guaranteed.

4 Claims, 2 Drawing Sheets

SERVICE BATTERY CHARGING MANAGEMENT DEVICE AND METHOD FOR POWER SUPPLY OF RECREATIONAL VEHICLE

TECHNICAL FIELD

The present disclosure relates to the technical field of power supply of recreational vehicle, and more particularly to a service battery charging management device for power supply of a recreational vehicle and a service battery charging management method for power supply of a recreational vehicle.

BACKGROUND

A power supply system of a recreational vehicle, or motor home, usually includes two systems, one system includes a vehicle generator and a starting battery, which are used for supplying power to a starter motor, a headlamp and a vehicle-mounted system of the vehicle; another system is a service battery, and the service battery is mainly used for supplying power to household electricity consumption such as internal life illumination, a pedal, a water pump of the recreational vehicle and the like. In current applications, a starting battery and a service battery are connected mainly through a switch, when the vehicle is running; the vehicle generator charges the starting battery and charges the service battery simultaneously by switching on the switch. When the engine is stopped, the switch is switched off, and the service battery independently provides power supply for such as life illumination of the recreational vehicle, water pump and the like.

At present, most of recreational vehicles can utilize clean solar energy to supply power for them, and the solar cell panel is generally used as a power supply power supply of the household electricity consumption of the recreational vehicle and directly supplies power to the service battery, in this way, the vehicle generator needs not to supply power to the service battery, and thus energy consumption can be reduced. However, if the service battery is only powered by the solar cell panel, a condition of insufficient power supply of the solar cell panel may occur in rainy days, which causes the service battery to be insufficient in charging, so that usage requirements including the internal life illumination of the recreational vehicle are influenced.

SUMMARY

A purpose of the present application is providing a service battery charging management device and method for power supply of a recreational vehicle, which ensures a normal power supply of a household electricity consumption of the recreational vehicle by reasonably selecting a charging power supply of the service battery.

In order to implement the purpose described above, a technical solution adopted by the present application is:

a service battery charging management device for power supply of a recreational vehicle, comprising: a vehicle generator, a solar cell panel, a MCU main control unit, an input automatic switching unit, a charging main converting DC/DC circuit, a charging current detection unit, a service battery, a voltage detection unit, a temperature detection unit, a PWM mode charging unit, a load current detection unit, a load, and a bypass unit;

wherein the vehicle generator is connected with the MCU main control unit and is configured to transmit output voltage thereof to the MCU main control unit; meanwhile, an output terminal of the vehicle generator is on one hand connected with the load through the bypass unit for charging the load, and on the other hand is connected to the service battery through the input automatic switching unit, the charging main converting DC/DC circuit and the charging current detection unit for charging the service battery;

the solar cell panel is connected with the MCU main control unit and is configured to transmit an output voltage thereof to the MCU main control unit; an output terminal of the solar cell panel is on one hand connected with a starting battery through the PWM mode charging unit for charging the starting battery, and on the other hand is connected with the service battery through the input automatic switching unit, the charging main converting DC/DC circuit and the charging current detection unit for charging the service battery;

the service battery is connected with the load through the load current detection unit and is configured to provide working power supply to the load;

both the charging current detection unit and the load current detection unit are configured to be connected to the MCU main control unit for respectively transmitting charging current and load current of the service battery to the MCU main control unit; the service battery is on one hand connected with the MCU main control unit through the voltage detection unit, the voltage detection unit is configured to detect a voltage of the service battery and transmits the voltage value to the MCU main control unit; the service battery is on the other hand connected with the MCU main control unit through the temperature detection unit, the temperature detection unit is configured to detect an operating temperature of the service battery and transmit the temperature value to the MCU main control unit;

the MCU main control unit is connected with the input automatic switching unit and the charging main converting DC/DC circuit, the charging main converting DC/DC circuit is provided with a MPPT charging mode and a switching power supply charging mode; and the MCU main control unit is configured to control the input automatic switching unit and the charging main converting DC/DC circuit according to the output voltage of the solar cell panel and the output voltage of the vehicle generator, and is further configured to adjust the charging main converting DC/DC circuit according to the operating temperature and the voltage of the service battery; and the MCU main control unit is connected with the bypass unit and is configured for on-off control of the bypass unit according to the charging current of the service battery and the load current; the MCU main control unit is further connected with the PWM mode charging unit and is configured for on-off control of the PWM mode charging unit according to a state of the service battery.

A service battery charging management method for power supply of a recreational vehicle, the management method is applied with the aforesaid service battery charging management device for power supply of a recreational vehicle and particularly comprises:

step 1, determining an output voltage $V_{PV}$ of a solar cell panel and an output voltage $V_{ALT}$ of the vehicle generator according to a MCU main control unit, controlling the input automatic switching unit to select a vehicle generator to charge the service battery if only the vehicle generator outputs the output voltage $V_{ALT}$ and controlling the charging main converting DC/DC circuit to operate in a switching power supply charging mode simultaneously via the MCU main control unit, and then entering step 3;

controlling the input switching unit to select the solar cell panel to charge the service battery and controlling the charging main converting DC/DC circuit to operate in a MPPT charging mode via the MCU main control unit to improve a charging efficiency of the service battery using the solar cell panel, and then performing step 3, if only the solar cell panel outputs the output voltage $V_{PV}$; or entering step 2 if both the solar cell panel and the vehicle generator have an output voltage;

step 2, comparing the output voltage $V_{PV}$ of the solar cell panel with the output voltage $V_{ALT}$ of the vehicle generator via the MCU main control unit, controlling the input switching unit to select the solar cell panel to charge the service battery and controlling the charging main converting DC/DC circuit to operate in the MPPT charging mode via the MCU main control unit if the output voltage $V_{PV}$ of the solar cell panel is higher than the output voltage $V_{ALT}$ of the vehicle generator, and then entering the step 3;

controlling the input automatic switching unit to select the vehicle generator to charge the service battery and controlling the charging main converting DC/DC circuit to operate in a switching power supply charging mode via the MCU main control unit, if the output voltage $V_{PV}$ of the solar cell panel is lower than the output voltage $V_{ALT}$ of the vehicle generator;

controlling the input automatic switching unit to select the solar cell panel and the vehicle generator to charge the service battery simultaneously and controlling the charging main converting DC/DC circuit to operate in the switching power supply charging mode via the MCU main control unit, if the output voltage $V_{PV}$ of the solar cell panel is equal to the output voltage $V_{ALT}$ of the vehicle generator, and then entering step 3;

step 3, determining whether the service battery is fully charged or not according to a voltage detection unit and a charging current detection unit and controlling the input automatic switching unit to disconnect the service battery with the charging power supply and stopping charging the service battery via the MCU main control unit, if the service battery is fully charged;

when the solar cell panel charges the service battery independently or both the solar cell panel and the vehicle generator charge the service battery simultaneously, controlling the input automatic switching unit to disconnect the service battery with the charging power supply and controlling a PWM mode charging unit to be opened via the MCU main control unit in order that the solar cell panel charges the starting battery, if the service battery is fully charged;

in a charging process of the service battery, detecting and transmitting a charging current of the service battery to the MCU main control unit by the charging current detection unit; detecting and transmitting the load current provided from the service battery to the load to the MCU main control unit via the load current detection unit, comparing the charging current with the load current and controlling the bypass unit to be closed via the MCU control unit in order that the vehicle generator directly provides power supply to the load, if the load current is greater than the charging current;

in the charging process of the service battery, detecting and transmitting the operation temperature of the service battery to the MCU main control unit through the temperature detection unit; controlling an output voltage value of the charging main converting DC/DC circuit via the MCU main control unit according to the operation temperature, where a temperature of 25° C. is taken as a reference; if the temperature is reduced by 1° C. as compared to the reference, the output voltage is increased by 12 mV; if the temperature is increased by 1° C. as compared to the reference, the output voltage is reduced by 12 mV; and monitoring a voltage of the service battery in real time and transmitting the voltage value to the MCU main control unit via the voltage detection unit, controlling the output voltage value of the charging main converting DC/DC circuit according to the voltage value via the MCU main control unit; and increasing the output voltage value of the charging main converting DC/DC circuit until the voltage of the service battery reaches a rated voltage value, when the voltage of the service battery is lower than a rated voltage output; wherein a maximum value of voltage compensation is 1V.

After applying the aforesaid technical solutions, the MCU main control unit of the present application controls the input automatic switching unit according to the conditions of the output voltage of the solar cell panel and the output voltage of the vehicle generator, so that the solar cell panel and the vehicle generator can selectively serve as a charging power supply of the service battery. When the output voltage of the solar panel is higher than the output voltage of the vehicle generator, the solar cell panel is used to serve as the charging power source of the service battery; when the output voltage of the solar panel is equal to the output voltage of the vehicle generator, the solar cell panel and the vehicle generator are used together to serve as the charging power source of the service battery, however; when the output voltage of the solar cell panel is lower than the output voltage of the vehicle generator, the vehicle generator is used to serve as the charging power source of the service battery; in this way, the service battery is kept in an alternative-charging state, so that a normal power supply of household electricity consumption of the recreational vehicle is guaranteed. Moreover, the MCU main control unit can also determine the state of the service battery under the condition that the solar cell panel has an output voltage, when the service battery is in a fully charged state, the MCU main control unit may stop charging of the service battery and control the solar cell panel to charge the starting battery simultaneously, thereby making use of clean solar energy much better.

In addition, the MCU main control unit of the present application collects the charging current and the load current of the service battery, and controls the bypass unit to be closed when the load current is greater than the charging current, such that the vehicle generator can directly supply power to the load.

In the present application, the voltage detection unit and the temperature detection unit are respectively configured to perform a voltage detection and a temperature detection on the battery and transmit data to the MCU main control unit, the MCU main control unit adjusts the output voltage of the charging main converting DC/DC circuit according to the voltage and the temperature of the service battery, thereby achieving temperature compensation and voltage compensation, so that a normal charging of the service battery is guaranteed.

DESCRIPTION OF THE EMBODIMENTS

The present application discloses a service battery charging management device and method for power supply of a recreational vehicle, which select a charging power supply of a service battery 9 by comparing an input power supply from a solar power cell panel 2 with an input power supply from a vehicle generator 1, such that the service battery can be kept in an optimal charging state, so that a normal power supply of household electric consumption of the recreational vehicle can be guaranteed.

Figure 1:
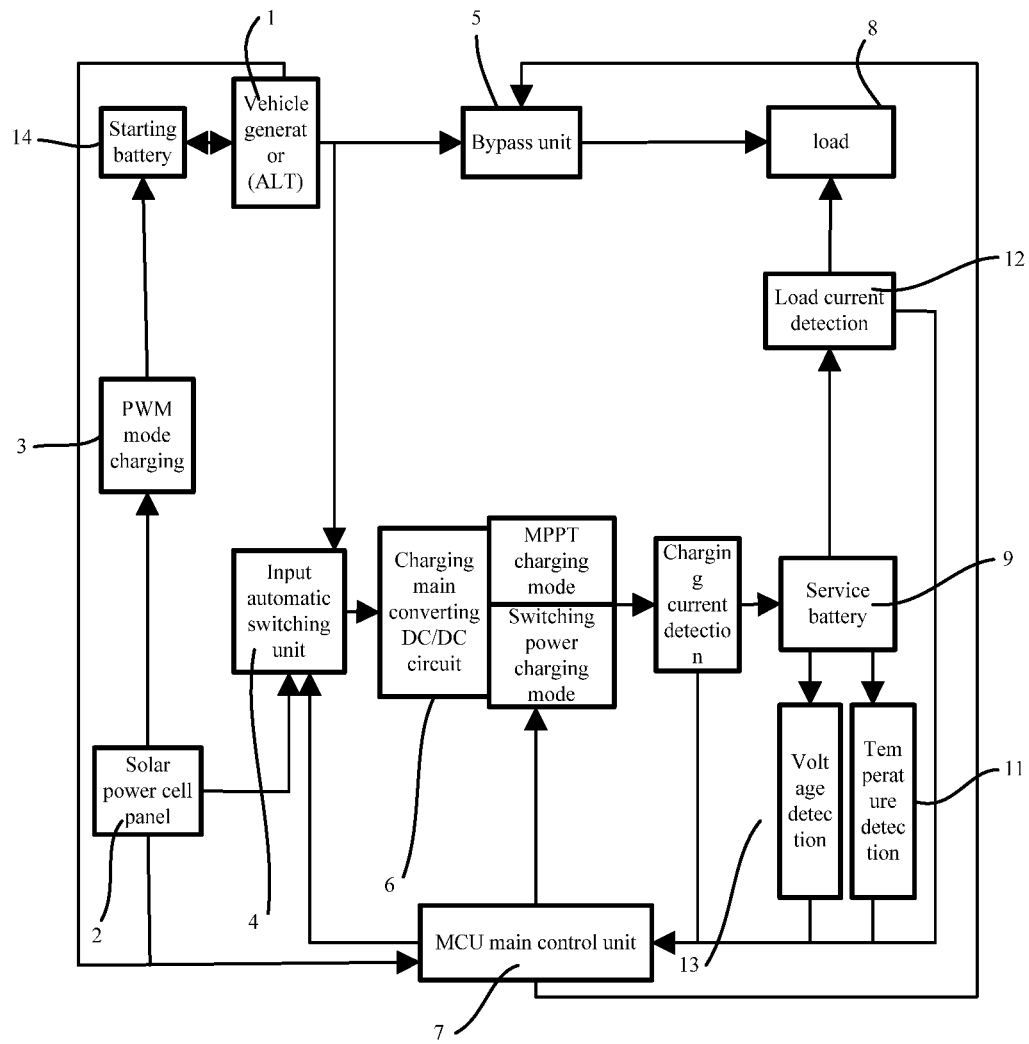
FIG. 1 illustrates a principle block diagram of an embodiment of the present application.

As shown in FIG. 1, the service battery charging management device for power supply of recreational vehicle comprises a vehicle generator 1, a solar cell panel (PV) 2, a MCU main control unit 7, an input automatic switching unit 4, a charging main converting DC/DC circuit 6, a charge current detection unit, a service battery 9, a voltage detection unit, a temperature detection unit and a PWM (Pulse Width Modulation) mode charging unit, a load current detection unit, a load 8 and a bypass unit 5.

The vehicle generator 1 is connected with the MCU main control unit 7 and is configured to transmit an output voltage thereof to the MCU main control unit 7; an output terminal of the vehicle generator 1 is on one hand connected with the load through the bypass unit 5 for charging the load 8, and on the other hand is connected with the service battery 9 through the input automatic switching unit 4, the charging main converting DC/DC circuit 6, and the charging current detection unit 13 for charging the service battery 9.

The solar cell panel 2 is connected with the MCU main control unit 7 and is configured to transmit an output voltage thereof to the MCU main control unit 7; meanwhile, an output terminal of the solar cell panel 2 is on one hand connected with a starting battery 14 through the PWM mode charging unit 3 for charging the starting battery 14 and on the other hand is connected with the service battery 9 through the input automatic switching unit 4, the charging main converting DC/DC circuit 6 and the charging current detection unit 13 for charging the service battery 9.

The service battery 9 is connected with the load 8 through the load current detection unit 12 and is configured to provide working power supply to the load 8.

Both the charging current detection unit 13 and the load current detection unit 12 are configured to be connected to the MCU main control unit 7 for transmitting a charging current and a load current of the service battery 9 to the MCU main control unit 7; the service battery 9 is on one hand connected with the MCU main control unit 7 through the voltage detection unit 10, and the voltage detection unit 10 is configured to detect the voltage of the service battery 9 and transmit the voltage value to the MCU main control unit 7; the service battery 9 is on the other hand connected with the MCU main control unit 7 through the temperature detection unit 11, and the temperature detection unit 11 is configured to detect an operating temperature of the service battery 9 and transmit the temperature value to the MCU main control unit 7.

The MCU main control unit 7 is connected with the input automatic switching unit 4 and the charging main converting DC/DC circuit 6, the charging main converting DC/DC circuit 6 is provided with a MPPT (Maximum Power Point Tracking) charging mode and a switching power supply charging mode; the MCU main control unit 7 is configured to control the input automatic switching unit 4 and the charging main converting DC/DC circuit 6 according to the output voltage of the solar cell panel 2 and the output voltage of the vehicle generator 1 and adjust the charging main converting DC/DC circuit 6 according to the operating temperature and the voltage of the service battery 9; the MCU main control unit 7 is further connected with the bypass unit 5 and is configured for on-off control of the bypass unit 5 according to the charging current and the load current of the service battery 9. The MCU main control unit 7 is further connected with the PWM mode charging unit 3 and is configured for on-off control of the PWM mode charging unit according to the state of the service battery 9.

Figure 2:
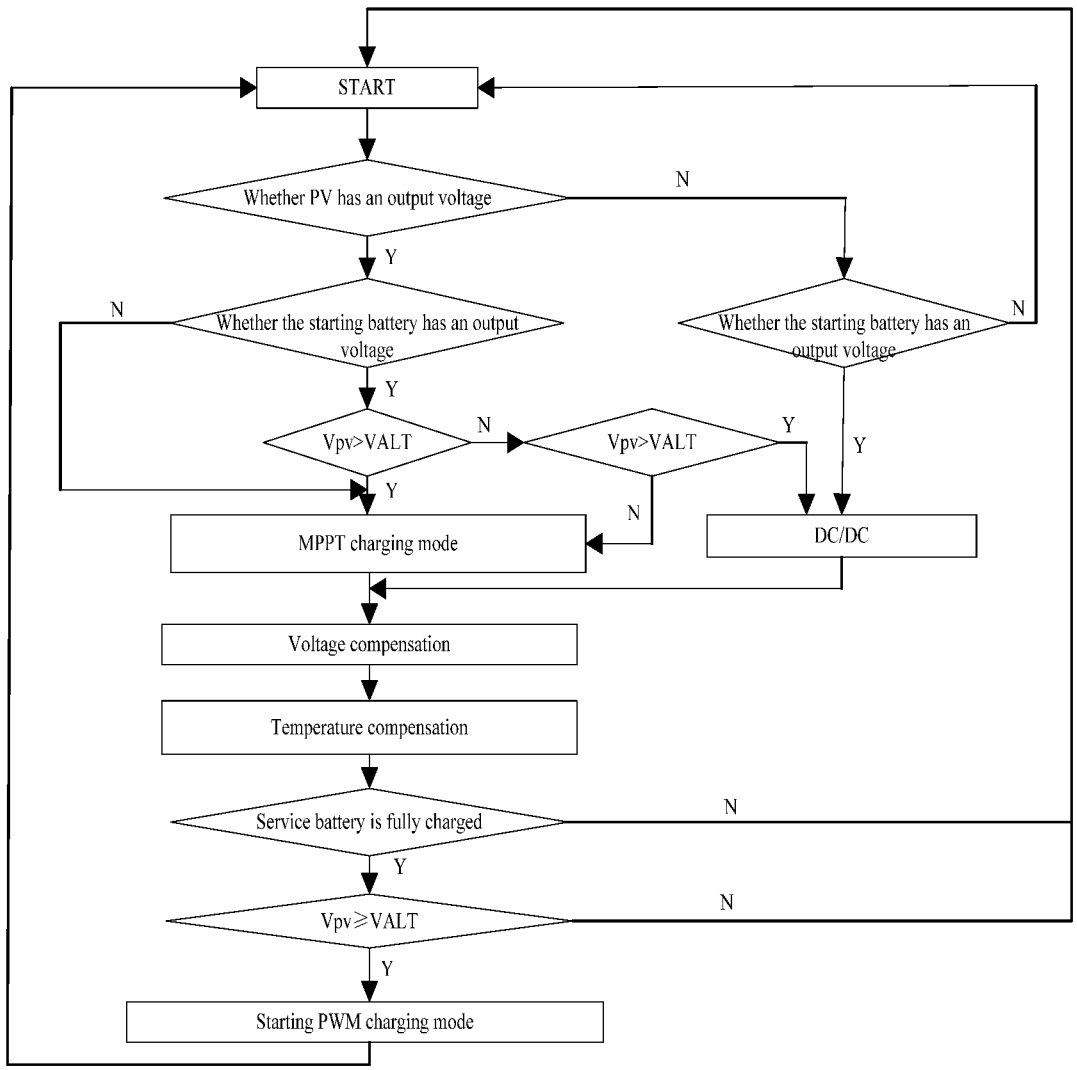
FIG. 2 illustrates a flowchart of an embodiment of the present application.

As shown in FIG. 2, based on the aforesaid service battery charging management device, an embodiment of the present application discloses a service battery charging management method for power supply of a recreational vehicle, which particularly comprises the steps as follows:

In step 1, the MCU main control unit determines an output voltage $V_{PV}$ of a solar cell panel 2 and an output voltage $V_{ALT}$ of a vehicle generator 1. The MCU main control unit controls the input automatic switching unit to select the vehicle generator 1 to charge the service battery and controls the charging main converting DC/DC circuit to operate in a switching power supply charging mode if only the vehicle generator 1 outputs the output voltage $V_{ALT}$ and the MCU main control unit control the input switching unit to select the solar cell panel 2 to charge the service battery and controls the charging main converting DC/DC circuit to operate in the MPPT charging mode to improve efficiency of charging the service battery using the solar cell panel 2 if only the solar cell panel 2 outputs the output voltage $V_{PV}$, and then step 3 is performed. If both the solar cell panel 2 and the vehicle generator 1 have output voltages step 2 is performed.

In step 2, the MCU main control unit compares the output voltage $V_{PV}$ of the solar cell panel 2 with the output voltage $V_{ALT}$ of the vehicle generator 1. The MCU main control unit controls the input switching unit to select the solar cell panel 2 to charge the service battery and controls the charging main converting DC/DC circuit to operate in the MPPT charging mode if the output voltage $V_{PV}$ of the solar cell panel 2 is higher than the output voltage $V_{ALT}$ of the vehicle generator 1, and then step 3 is performed;

The MCU main control unit controls the input automatic switching unit to select the vehicle generator 1 to charge the service battery and controls the charging main converting DC/DC circuit to operate in a switching power supply charging mode if the output voltage $V_{PV}$ of the solar cell panel is lower than the output voltage $V_{ALT}$ of the vehicle generator, and then step 3 is performed;

The MCU main control unit controls the input automatic switching unit to select both the solar cell panel 2 and the vehicle generator 1 to charge the service battery and controls the charging main converting DC/DC circuit 6 to operate in the switching power supply charging mode if the output voltage $V_{PV}$ of the solar cell panel 2 is equal to the output voltage $V_{ALT}$ of the vehicle generator 1, and then step 3 is performed.

In step 3, the MCU main control unit determines whether the service battery is fully charged or not according to the voltage detection unit and the charging current detection unit. The MCU main control unit controls the input automatic switching unit to disconnect the service battery with the charging power supply to stop charging the service battery, if the service battery is fully charged;

When the solar cell panel 2 charges the service battery independently, the MCU main control unit 7 controls the input automatic switching unit to disconnect the service battery with the solar cell panel 2 and controls the PWM mode charging unit 3 to be opened in order that the solar cell panel 2 charges the starting battery, if the service battery is fully charged.

When both the solar cell panel 2 and the vehicle generator 1 charge the service battery, the MCU main control unit controls the input automatic switching unit to disconnect the service battery with the solar cell panel 2 and disconnect the service battery with the vehicle generator 1, and controls the PWM mode charging unit to be opened in order that the solar cell panel 2 charges the starting battery, if the service battery is fully charged.

In a charging process of the service battery 9, a charging current of the service battery is detected and transmitted to the MCU main control unit 7 by the charging current detection unit 13; the load current provided from the service battery 9 to the load is detected and transmitted to the MCU main control unit 7 by the load current detection unit 12, the MCU main control unit 7 compares the charging current with the load current and controls the bypass unit 5 to be closed, so that the vehicle generator 1 directly provides power supply to the load 8 to ensure that the load can perform normally, if the load current is greater than the charging current.

In the charging process of the service battery, the operation temperature of the service battery is detected and transmitted to the MCU main control unit by the temperature detection unit; the MCU main control unit controls an output voltage value of the charging main converting DC/DC circuit according to the operation temperature. Specifically a temperature of 25° C. is taken as a reference; if the temperature is reduced by 1° C. as compared to the reference, the output voltage is increased by 12 mV; if the temperature is increased by 1° C. as compared to the reference, the output voltage is reduced by 12 mV.

A voltage of the service battery is monitored in real time and is transmitted to the MCU main control unit by the voltage detection unit, the output voltage value of the charging main converting DC/DC circuit is controlled by the MCU main control unit according to value of the voltage; the output voltage value of the charging main converting DC/DC circuit is increased until the voltage of the service battery reaches a rated voltage value, when the voltage of the service battery is lower than a rated voltage output; where a maximum value of voltage compensation is 1V.

In present application: the MCU main control unit of the present application controls the input automatic switching unit according to the conditions of the output voltage of the solar cell panel 2 and the output voltage of the vehicle generator 1, so that the solar cell panel 2 and the vehicle generator 1 can selectively serve as a charging power supply of the service battery. When the output voltage of the solar panel 2 is higher than the output voltage of the vehicle generator 1, the solar cell panel 2 is used to serve as the charging power source of the service battery; when the output voltage of the solar panel 2 is equal to the output voltage of the vehicle generator 1, the solar cell panel 2 and the vehicle generator 1 are used together to serve as the charging power sources of the service battery; and when the output voltage of the solar cell panel 2 is lower than the output voltage of the vehicle generator 1, the vehicle generator 1 is used to serve as the charging power source of the service battery; in this way, the service battery is kept in an alternative-charging state, so that a normal power supply of a household electricity consumption of the recreational vehicle is guaranteed. Moreover, the MCU main control unit can also determine the state of the service battery under the condition that the solar cell panel 2 has an output voltage, and may stop charging of the service battery and control the solar cell panel 2 to charge the starting battery when the service battery is in a fully charged state, thereby making use of clean solar energy much better.

In addition, the MCU main control unit of the present application collects the charging current and the load current of the service battery and controls the bypass unit to be closed when the load current is greater than the charging current, such that the vehicle generator 1 can directly supply power to the load.

In the present application, the voltage detection unit and the temperature detection unit are respectively configured to perform voltage detection and temperature detection on the battery and transmit data to the MCU main control unit, the MCU main control unit adjusts the output voltage of the charging main converting DC/DC circuit according to the voltage and the temperature of the service battery, thereby achieving temperature compensation and voltage compensation, so that normal charging of the service battery is guaranteed.

The aforementioned embodiments are only preferred embodiments of the present application, and should not be regarded as being limitation to the present application. Any slight modification, equivalent replacement and modification, which are made according to the substance of the techniques of the present application, should be included in the protection scope of the technical solution of the present application.

What is claimed is:

1. A service battery charging management device for power supply of a recreational vehicle, comprising: a vehicle generator, a solar cell panel, a MCU main control unit, an input automatic switching unit, a charging main converting DC/DC circuit, a charging current detection unit, a service battery, a voltage detection unit, a temperature detection unit, a PWM mode charging unit, a load current detection unit, a load, and a bypass unit;

wherein the vehicle generator is connected with the MCU main control unit and is configured to transmit an output voltage $V_{ALT}$ thereof to the MCU main control unit; meanwhile, an output terminal of the vehicle generator is connected with the load through the bypass unit for charging the load, and also is connected to the service battery through the input automatic switching unit, the charging main converting DC/DC circuit and the charging current detection unit for charging the service battery;

the solar cell panel is connected with the MCU main control unit and is configured to transmit an output voltage $V_{PV}$ thereof to the MCU main control unit;

an output terminal of the solar cell panel is connected with a starting battery through the PWM mode charging unit for charging the starting battery, and also is connected with the service battery through the input automatic switching unit, the charging main converting DC/DC circuit and the charging current detection unit for charging the service battery;

the service battery is connected with the load through the load current detection unit and is configured to provide working power supply to the load;

both the charging current detection unit and the load current detection unit are configured to be connected to the MCU main control unit for respectively transmitting charging current and load current of the service battery to the MCU main control unit; the service battery is connected with the MCU main control unit through the voltage detection unit, wherein the voltage detection unit is configured to detect a voltage of the service battery and transmits the voltage value to the MCU main control unit; the service battery is also connected with the MCU main control unit through the temperature detection unit, wherein the temperature detection unit is configured to detect an operating temperature of the service battery and transmit the temperature value to the MCU main control unit;

the MCU main control unit is connected with the input automatic switching unit and the charging main converting DC/DC circuit, wherein the charging main converting DC/DC circuit is provided with a MPPT charging mode and a switching power supply charging mode; and the MCU main control unit is configured to control the input automatic switching unit and the charging main converting DC/DC circuit according to the output voltage $V_{PV}$ of the solar cell panel and the output voltage $V_{ALT}$ of the vehicle generator, and is further configured to adjust the charging main converting DC/DC circuit according to the operating temperature and the voltage of the service battery; and the MCU main control unit is connected with the bypass unit and is configured for on-off control of the bypass unit according to the charging current of the service battery and the load current; the MCU main control unit is further connected with the PWM mode charging unit and is configured for on-off control of the PWM mode charging unit according to a state of the service battery.

2. A service battery charging management method for power supply of a recreational vehicle, the management method is applied with the service battery charging management device for power supply of a recreational vehicle according to claim 1, and particularly comprises:

step 1, determining the output voltage $V_{PV}$ of the solar cell panel and the output voltage $V_{ALT}$ of the vehicle generator according to a MCU main control unit, controlling the input automatic switching unit to select the vehicle generator to charge the service battery if only the vehicle generator outputs the output voltage $V_{ALT}$, and controlling the charging main converting DC/DC circuit to operate in a switching power supply charging mode simultaneously via the MCU main control unit, and then entering step 3;

controlling the input switching unit to select the solar cell panel to charge the service battery and controlling the charging main converting DC/DC circuit to operate in a MPPT charging mode via the MCU main control unit to improve a charging efficiency of the service battery using the solar cell panel, and then performing step 3, if only the solar cell panel outputs the output voltage $V_{PV}$; or entering step 2 if both the solar cell panel and the vehicle generator have an output voltage;

step 2, comparing the output voltage $V_{PV}$ of the solar cell panel with the output voltage $V_{ALT}$ of the vehicle generator via the MCU main control unit, controlling the input switching unit to select the solar cell panel to charge the service battery and controlling the charging main converting DC/DC circuit to operate in the MPPT charging mode via the MCU main control unit if the output voltage $V_{PV}$ of the solar cell panel is higher than the output voltage $V_{ALT}$ of the vehicle generator, and then entering the step 3;

controlling the input automatic switching unit to select the vehicle generator to charge the service battery and controlling the charging main converting DC/DC circuit to operate in a switching power supply charging mode via the MCU main control unit, if the output voltage $V_{PV}$ of the solar cell panel is lower than the output voltage $V_{ALT}$ of the vehicle generator;

controlling the input automatic switching unit to select the solar cell panel and the vehicle generator to charge the service battery simultaneously and controlling the charging main converting DC/DC circuit to operate in the switching power supply charging mode via the MCU main control unit, if the output voltage $V_{PV}$ of the solar cell panel is equal to the output voltage $V_{ALT}$ of the vehicle generator, and then entering step 3;

step 3, determining whether the service battery is fully charged or not according to athe voltage detection unit and a charging current detection unit and controlling the input automatic switching unit to disconnect the service battery with the charging power supply, and stopping charging the service battery via the MCU main control unit, if the service battery is fully charged;

when the solar cell panel charges the service battery independently or both the solar cell panel and the vehicle generator charge the service battery simultaneously, controlling the input automatic switching unit to disconnect the service battery with the charging power supply and controlling a PWM mode charging unit to be opened via the MCU main control unit in order that the solar cell panel charges the starting battery, if the service battery is fully charged.

3. The service battery charging management method for power supply of a recreational vehicle according to claim 2, further comprising: in a charging process of the service battery, detecting and transmitting a charging current of the service battery to the MCU main control unit by the charging current detection unit; detecting and transmitting the load current provided from the service battery to the load to the MCU main control unit via the load current detection unit, comparing the charging current with the load current and controlling the bypass unit to be closed via the MCU control unit in order that the vehicle generator directly provides power supply to the load, if the load current is greater than the charging current.

4. The service battery charging management method for power supply of a recreational vehicle according to claim 2, further comprising: in the charging process of the service battery, detecting and transmitting the operation temperature of the service battery to the MCU main control unit through the temperature detection unit; controlling an output voltage value of the charging main converting DC/DC circuit via the MCU main control unit according to the operation temperature, wherein a temperature of 25° C. is taken as a reference, and if the temperature is reduced by 1° C. compared to the reference, the output voltage is increased by 12 mV; if the temperature is increased by 1° C. compared to the reference, the output voltage is reduced by 12 mV; and monitoring a voltage of the service battery in real time and transmitting the voltage value to the MCU main control unit via the voltage detection unit, controlling the output voltage value of the charging main converting DC/DC circuit according to the voltage value via the MCU main control unit; and increasing the output voltage value of the charging main converting DC/DC circuit until the voltage of the service battery reaches a rated voltage value, when the voltage of the service battery is lower than a rated voltage output; wherein a maximum value of voltage compensation is 1V.

* * * * *